March 15, 1932.  G. R. LIVERGOOD  1,849,102
SLIP BUSHING
Filed July 14, 1928   2 Sheets-Sheet 1
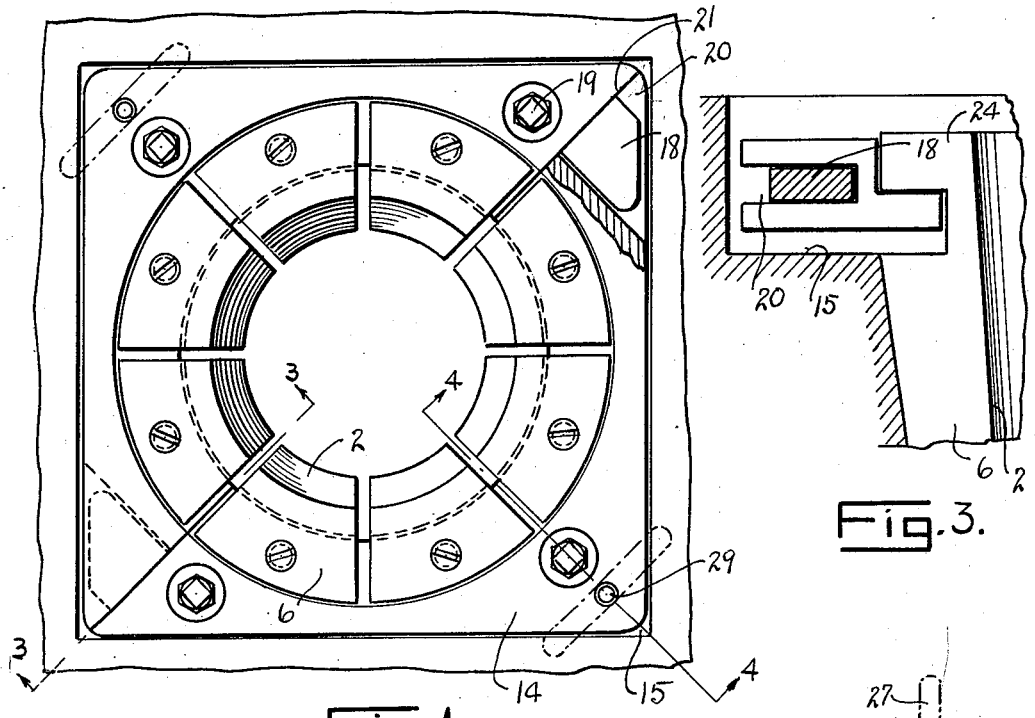
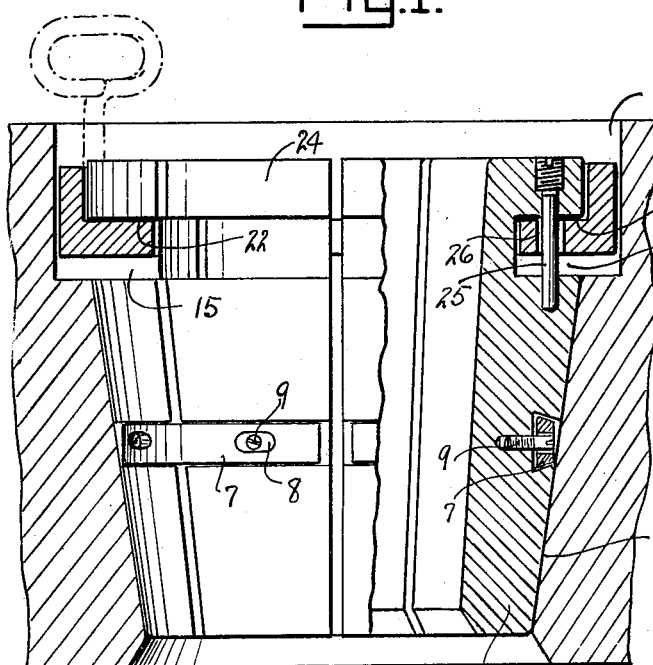
Fig.1.  Fig.2.  Fig.3.  Fig.4.
Inventor
Gerald R. Livergood
By Jesse R. Stone
Attorney March 15, 1932. G. R. LIVERGOOD 1,849,102
SLIP BUSHING
Filed July 14, 1928 2 Sheets-Sheet 2
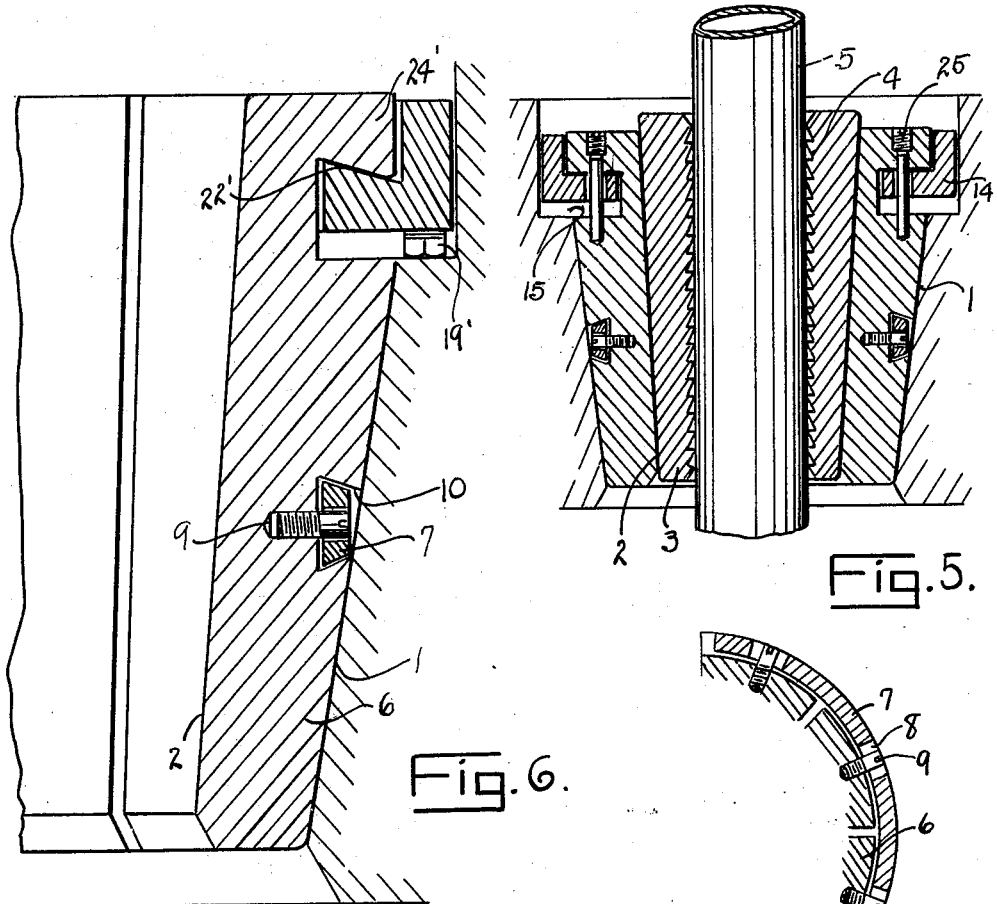
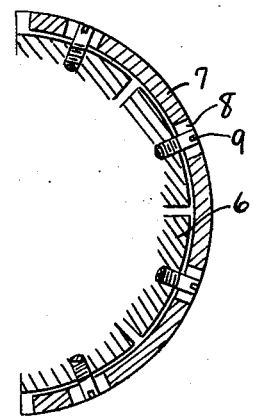
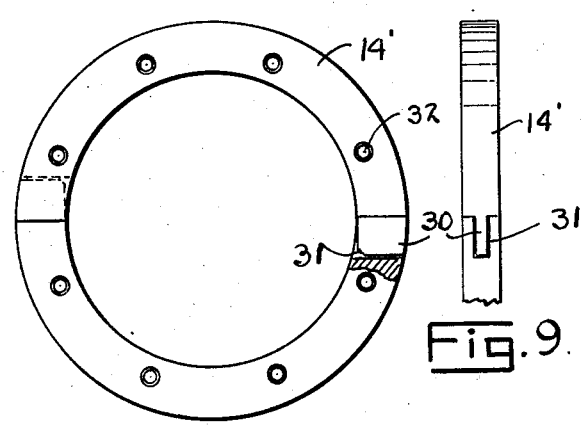

Patented Mar. 15, 1932

1,849,102

UNITED STATES PATENT OFFICE

GERALD R. LIVERGOOD, OF HOUSTON, TEXAS

SLIP BUSHING

Application filed July 14, 1928. Serial No. 292,843.

My invention relates to bushings for use with slips in handling pipe in wells.

In well drilling and pumping operations when pipe is being inserted into or removed from the well it is necessary to hold the weight of the pipe by slips fitting within a bushing supported within the rotary table or within a special type of casing head. The slips are tapered jaws adapted to seat in the bushing or adapter, and wedge between the same and the pipe, and sustain the weight of the pipe in the well.

The adapter bushing is ordinarily a downwardly tapered tubular bowl which wedges the slips towards the pipe and, as the bowl is rigid, the slips sometimes are wedged therein so tightly by the immense weight which they have to support that it is difficult to withdraw the slips. A maul or hammer has to be employed to jar the slips loose from the bushing.

It is an object of my invention to provide a bushing which will release the slips employed therewith quickly and without difficulty.

It is desired that the bushing be flexible in construction so that it will not lock with the slip jaws, but will release as soon as the pipe is elevated.

A further object is to produce a bushing which may be adjusted to vary the working diameter thereof and which may be readily handled in use.

It is desired that the bushing be constructed to fit within a rotary table or spider and the holding means by means of which the parts of the bushing are held together is designed to be seated within an opening in the rotary table, preferably in such manner that the bushing will not rotate relative to the table.

Referring to the drawings herewith, Fig. 1 is a top plan view of the bushing, parts being broken away for greater clearness.

Fig. 2 is a side view of the bushing seated in a rotary table, part of the bushing being in vertical section illustrating the means for securing the parts of the bushing together.

Fig. 3 is a broken detail of the holding plate employed with the bushing taken on the plate 3—3 of Fig. 1.

Fig. 4 is a broken sectional detail taken on the plane 4—4 of Fig. 1.

Fig. 5 is a vertical section through my bushing showing the pipe engaging slips in place therein.

Fig. 6 is a fragmental view, partly in vertical section, showing one form of engagement between the plate and the bushing.

Fig. 7 is a horizontal section showing the lower ring.

Fig. 8 is a plan view of a holding plate to fit a circular opening.

Fig. 9 is a fragmental edge view of the plate shown in Fig. 8.

In constructing my bushing I contemplate forming the same of the general shape now commonly employed; that is, it is a tubular bowl tapered from its upper end downwardly to fit within the tapered seat 1 within a rotary table. It is tapered on its inner side at 2 to receive the jaws 3 of slips which are toothed on their inner faces at 4 to engage the pipe 5. The tapered bowl is divided longitudinally into a plurality of parts and as will be seen from Fig. 1 I have divided the bowl into eight longitudinal sections. By this provision I am enabled to allow a certain flexibility between the sections of the bushing which will allow it to release from the seat 1 while in operation.

The sections 6 into which the bowl is divided are formed with radial sides and the inner face 2 of each section is tapered at a comparatively acute angle relative to the central axis of the bushing so that the jaws of the slips may obtain a tight wedging effect between the pipe and the bushing and more effectively grip the pipe. The outer faces of the sections somewhat below the longitudinal center thereof are grooved to receive the curved plates 7. In Fig. 7 I have shown one form of plate which may be employed, there being openings 8 in spaced positions on the plate to allow the insertion there-through of pins or dowels 9. The openings are elongated horizontally so as to allow a slight lateral movement of the jaw sections relative to the holding plate. The screws or dowels 9 are secured within the inner sides of grooves 10 in the outer faces of the sections. As will be seen from Figs. 2, 5 and 6, the plates 7 are of greater width on the inner sides than on the outer sides, thereby providing a dovetail effect, preventing the outward movement of the plates in the grooves. The plates fit loosely in the grooves so as to allow relative movement of the sections of the bushing, as will be apparent. The two plates 7 form a circle divided diametrically and act to secure the bushing sections together as two units adapted to be inserted within the seat in the table and which, when fitted together, entirely surround the opening through the table.

Adjacent the upper end of the bushing is a holding plate for the sections. In the Fig. 1 embodiment this plate 14 is rectangular in shape to fit within a recess 15 in the rotary table. Said plate is divided diagonally into two sections and these sections may be secured together by tongues 18 at the corners along the meeting line 21. Said tongues are formed one upon one half of the plate and the other upon the other half and each projects into a slot 20 in the mating half. When thus fitted together and set within the recess in the table the parts will be held together during operation.

The plate 14 is formed with a central opening of suitable size to receive the bushing. The said opening is circular and is provided with a cutaway portion on its inner upper side to provide a seat 22 for the bushing sections 6. The said bushing is cut with an annular groove 15 into which said plate projects, the upper flange 24 thus provided upon the sections resting upon the seat 22. The groove is materially wider than the thickness of the plate below the flange 24 so that there is free vertical play of the sections of the bushing relative to the plate. The sections of the bushing are separately secured to the plate by pins 25 extended through the flanges 24 of the bushing sections, and through openings 26 in the plate, and into the body of the sections below the groove. The head of each pin is threaded to screw into the bushing section above the groove, as seen in Fig. 2. The openings 26 are materially larger than the pins so that the sections are freely movable on the plate. The handles 27 are connected with the plate 14.

The effective size of the bushing may be regulated by controlling the height of the supporting plate 14 in the seat 15 in the rotary table. By the use of the adjustable screws 19 at each corner of the plate I am enabled to raise or lower the bushing in its seat as will be understood from Fig. 4.

The plate may be made to engage the bushing as shown in Fig. 6, if desired. In this embodiment the seat 22' is sloped downwardly away from the bushing and the lower face of the flange 24' is also undercut and sloped to interfit with the seat so as to better cause the bushing sections to move outwardly into contact with the rotary seat 1. The adjusting pin 19' in this form may be screwed into the plate from below as shown.

Openings 29 in each half of the plate may be provided to receive a handle by means of which the plate and bushing may be moved when desired.

Sometimes the rotary seat is circular in shape, and in such case the plate 14 must be replaced by a circular plate 14' shown in Figs. 8 and 9. Each of the sections of the plate may have a tongue 30 fitting within a groove 31 in the other section. Openings 32 for the pins 25 are provided as before.

In use the bushing will seat within the rotary opening 1 with the upper flange 24 of the bushing resting upon the plate as seen in Fig. 2. The height of the plate in the recess 15 of the rotary seat is regulated by the pins 19 so that the effective diameter of the bushing may be changed to provide for wear or for variation in the sizes of rotary openings. Thus the pipe engaging slips will always be provided with a seat of a size to receive them. Furthermore, when the plate is thus held above the lower side of the recess 15 in the rotary seat, when the bushing is raised, each individual section can move freely to obtain release from the wedging action of the slips.

In handling my invention the sections of the bushing may be held together in two units by means of the divided plates 14 and 14', as described and may therefore be fitted within the seat 1 in the rotary table or in the casing head without difficulty. The outer taper of the bushing is a more obtuse taper than is the inner taper of the bushing and will be adapted to fit within and release easily from the rotary table. The separate sections of the bushing are joined so flexibly together that the bushing may be fitted within the ordinary rotary table with little difficulty and this flexible construction also allows the ready release of the bushing from the table so that no hammer or maul will be necessary at any time. This will be much easier in handling, it avoids the wear and tear upon the rotary and the bushing and allows the bushing to release without injury thereto or to the table. It also permits the slip jaws 3 to drop away from the pipe without injury to the slips or the pipe. The general purpose of the longitudinally divided bushing is therefore to obtain a quick release from the rotary table and from the pipe and to avoid the difficulties usually encountered where the bushing is a solid and rigid part.

This device is flexible in use and it will be seen that when the jaws have been placed therein as shown in Fig. 1 to grip the pipe, the release of the jaws from the pipe may be obtained by moving the pipe 5 upwardly. If the jaws 3 are tightly wedged between the bushing and the pipe so that they will not readily release, the bushing will be elevated with the pipe a sufficient distance to allow the sections of the bushing to spread away from the jaws and thus allow them to release without further difficulty.

The further advantages of the device will be apparent to those skilled in the art. What I claim as new is:

1. A slip supporting bushing for rotaries including a downwardly tapered bowl having a peripheral recess adjacent the upper end, said recess having its upper shoulder inclined downwardly and outwardly, a plate adapted to fit within said recess and engage said shoulder, means to support said plate, said plate being divided transversely into two parts, said bushing being longitudinally divided into a plurality of sections upon each part of said plate.

2. A slip supporting bushing for rotaries including a downwardly tapered bowl having a peripheral recess adjacent the upper end, said recess having its upper shoulder inclined downwardly and outwardly, a plate adapted to fit within said recess and engage said shoulder, a second plate adjacent the lower end, said plates being in two parts, and said bushing being longitudinally divided and associated with said plates, and means holding said bushing sections loosely upon said plates.

3. A slip-supporting bushing adapted to fit a tapered seat in combination with a rotary table having a seat, said bushing being longitudinally divided into sections, a plate holding said bushing sections together loosely, a shoulder on said seat, and adjusting screws on said plate engaging said shoulder and adapted to vary the vertical position of said bushing in said seat, for the purpose described.

4. A slip-supporting bushing adapted to fit a tapered seat, said bushing being longitudinally divided into sections, means holding said bushing sections loosely together, and adjusting means on said holding means cooperating with said seat to vary the working diameter of said bushing.

5. A downwardly tapered supporting bushing adapted to fit a tapered table seat, said bushing being divided longitudinally, and means to adjust said bushing within a certain range of positions whereby the working diameter of said bushing may be varied between a plurality of fixed positions.

6. A slip supporting bushing tapered on its outer face to fit a seat in a rotary table, and tapered on its inner side to receive pipe engaging slips, said bushing being formed in a plurality of parts, and means to adjust said bushing whereby its working diameter may be varied between a plurality of fixed positions.

7. A longitudinally divided slip supporting bushing adapted to fit a downwardly tapered rotary seat, and means to make a positive adjustment of said bushing vertically in said seat and thus vary its working diameter.

8. An adapter bushing including a tubular downwardly tapered bowl, shaped to fit a stationary support said bowl being divided longitudinally into a plurality of arcuate parts, each part being composed of a plurality of separate sections, the outer and inner walls of said sections converging downwardly and means to hold said sections loosely in spaced relation, said means including a plate divided transversely into two sections.

9. An adapter bushing including a tubular downwardly tapered bowl, said bowl being divided longitudinally into a plurality of arcuate parts, each part being composed of a plurality of separate sections, the outer and inner walls of said sections converging downwardly and means to hold said sections loosely in spaced relation, said means including a polygonal plate shaped to fit within a rotary table and divided diagonally into two halves, each half flexibly supporting a plurality of sections.

10. A longtiudinally divided adapter bushing, a rotary seat to receive said bushing, said seat having a countersunk recess at its upper end, a holding plate in said recess, said plate being divided into halves, a plurality of bushing sections on each half, means to adjust said plate vertically in said recess, and means on said plate engaging said bushing sections to allow said sections to move outwardly as said plate is raised.

11. A longitudinally divided adapter bushing, a rotary seat to receive said bushing, said seat having a countersunk recess at its upper end, a holding plate in said recess, a plurality of bushing sections on said plate, means to adjust said plate vertically in said recess, and means on said plate engaging said bushing sections whereby said sections may move outwardly as said plate is raised.

In testimony whereof I hereunto affix my signature this 10th day of July A. D. 1928.

GERALD R. LIVERGOOD.